United States Patent
Magiatis et al.

(10) Patent No.: US 12,466,779 B2
(45) Date of Patent: Nov. 11, 2025

(54) METHOD FOR OBTAINING OLEACEIN AND OLEOMISSIONAL TYPE SECOIRIDOIDS AND FOR PRODUCING RESPECTIVE PHARMACEUTICAL PREPARATIONS

(71) Applicant: OMPHAX SA, Ano Liosia (GR)

(72) Inventors: Prokopios Magiatis, Ampelakia Attikis (GR); Eleni Melliou, Ampelakia Attikis (GR); Panagiotis Diamantakos, Voula Attikis (GR); Aimilia Rigakou, Xirokampi Lakonias (GR)

(73) Assignee: OMPHAX SA, Ano Liosia (GR)

( * ) Notice: Subject to any disclaimer, the term of this patent is extended or adjusted under 35 U.S.C. 154(b) by 1127 days.

(21) Appl. No.: 17/430,467

(22) PCT Filed: Feb. 11, 2020

(86) PCT No.: PCT/GR2020/000014
§ 371 (c)(1),
(2) Date: Aug. 12, 2021

(87) PCT Pub. No.: WO2020/165613
PCT Pub. Date: Aug. 20, 2020

(65) Prior Publication Data
US 2022/0119335 A1    Apr. 21, 2022

(30) Foreign Application Priority Data
Feb. 13, 2019  (GR) .............................. 20190100075

(51) Int. Cl.
C07C 67/31 (2006.01)
A23L 33/10 (2016.01)
(Continued)

(52) U.S. Cl.
CPC .............. *C07C 67/31* (2013.01); *A23L 33/10* (2016.08); *A61K 31/7048* (2013.01); *C07C 67/56* (2013.01); *C07C 69/738* (2013.01)

(58) Field of Classification Search
CPC ........ C07C 67/31; C07C 67/56; C07C 69/738
See application file for complete search history.

(56) References Cited

U.S. PATENT DOCUMENTS 9,682,056 B2 * 6/2017 Czerwinska .............. A61P 9/04

FOREIGN PATENT DOCUMENTS

| EP | 3470069 A1 * | 4/2019 | .......... A61K 31/222 |
| JP | 5264269 B2 * | 8/2013 | ......... A61K 31/7048 |

(Continued)

OTHER PUBLICATIONS

Acin, S. et al., Olive oil preparation determines the atherosclerotic protection in apolipoprotein E knockout mice, Journal of Nutritional Biochemistry, 18, pp. 418-424 (Year: 2007).*

(Continued)

*Primary Examiner* — Yate' K Cutliff
(74) *Attorney, Agent, or Firm* — DP IP GROUP; Franco S. De Liguori

(57) ABSTRACT

The present invention relates to a method for obtaining in pure form or in a mixture the oleacein and oleomissional substances from olive fruits and leaves and certain derivatives thereof, the bioactive diol forms, by selective extraction of specially selected leaves or fruits with water or organic solvents. It also relates to pharmaceutical preparations containing the above substances in various combinations and the therapeutic properties of these preparations for the treatment of cancer, degenerative diseases of the central nervous system, diabetes, hyperlipidemia, inflammatory diseases and the prevention of creation of atherosclerotic plaques and thrombi.

14 Claims, 2 Drawing Sheets

Figure 1:
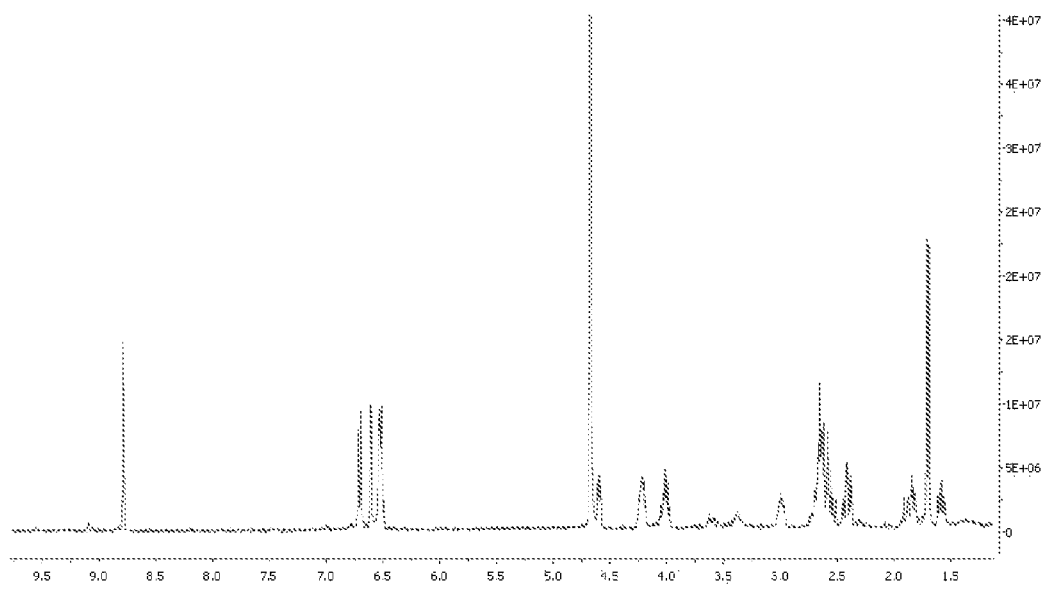

(51) Int. Cl.
*A61K 31/7048* (2006.01)
*C07C 67/56* (2006.01)
*C07C 69/738* (2006.01)

(56) References Cited

FOREIGN PATENT DOCUMENTS

WO    WO 2017/077134    5/2017
WO    WO2017/077134 A1 *    5/2017    ........... A61K 31/222

OTHER PUBLICATIONS

Dinino, A., et al., Virtual freezing f the hemiacetal-aldehyde equilibrium of the aglycones of oleuropein and ligstroside present in olive oils from carolea and coratina cultivars of ionspray ionization tandem mass spectrometry, Journal of Mass Spectrometry, 35(3) , pp. 461-467 (Year: 2000).*

Limiroli, R., et al., 1H nd 13C NMR characterization of new oleuropein aglycons, Journal of the Chemical Society, Perkin Transactions 1: Organic and Bio-organic chemistry, (12), pp. 1519-1523 (Year: 1995).*

Narasimuhulu, C. A., et al., Atherosclerosis—do we know enough already to prevent It, Current Opinion in Pharmacology, 27, pp. 92-102 (Year: 2016).*

Scognamiglio, M,. et al., Seasonal phytochemical changes in *Phillyrea angustifolia* L.: Metabolomic analysis and phytotoxicity assessment, Phytochemistry Letters, available online 2013, (8), pp. 163-170 (Year: 2014).*

JP5264269 B2 (JP2008116644A), Iwai Kazuo, et al., Sex hormone inducer and method for improving protein metabolism and constitution, English translation, 8 pages (Year: 2013).*

Antonio Procopio et al., "Synthethis, Biological Evaluation, and Molecular Modeling of Oleuropein and Its . . .", Journal of Agr. & Food Chemistry, vol. 57, No. 63, Dec. 9, 2009.

Conde E. et al., "Antioxidant activity of the phenolic compounds released by hidrothermal treatments of olive . . .", Food Chemistry, Elsevier Ltd., vol. 114, No. 3, Jun. 1, 2009.

* cited by examiner

METHOD FOR OBTAINING OLEACEIN AND OLEOMISSIONAL TYPE SECOIRIDOIDS AND FOR PRODUCING RESPECTIVE PHARMACEUTICAL PREPARATIONS

FIELD OF ART

The application relates to a method for obtaining pure oleacein and oleomissional from olive fruits or leaves as well as certain derivatives thereof, to pharmaceutical preparations containing certain of them and the therapeutic properties of these preparations. The application relates to the field of medicine, pharmacy and food science.

STATE OF THE ART

The secoiridoids of the following general type

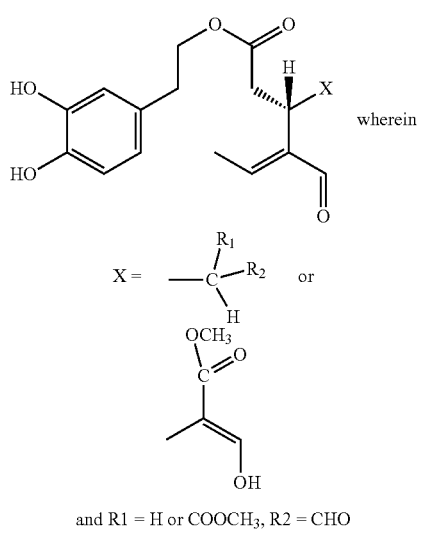

and R1 = H or COOCH₃, R2 = CHO are important ingredients of olive oil. Specifically, S-(E)-oleacein (1) and S-(E)-oleomissional (2) are phenolic substances present in most olive oil varieties at concentrations ranging from 0 to 1000 mg/Kg (Journal of Agricultural and Food Chemistry 2014, 62(3), 600-607, OLIVAE 2015, 122, 22-35). Substance (2) is in equilibrium with the corresponding dialdehydic forms (2a,b). For all those substances there are several published methods regarding their isolation from natural sources or their chemical synthesis and additionally for all of them there are numerous published biological and pharmaceutical properties (anti-inflammatory, anticancer, antidiabetic, neuroprotective, antioxidant).

However, the inventors, based on experiments they have carried out, are aware that these substances are not the true bioavailable active forms. In fact, substances (1), (2), when they come into contact with human biological fluids, they react chemically with water at a relatively slow rate, different for each substance, and are gradually converted to the active forms of 5S-(E)-oleaceinediol (3), 5S-(E)-oleomissionadiol (4) which exhibit increased activity and greatly increased water solubility with respect to substances (1), (2).

It is therefore very important to develop methods allowing the production of substances (3), (4) in pure form and pharmaceutical preparations or nutritional supplements or cosmetics which will contain the bioavailable forms (3), (4) individually or in mixture, thus not needing to be activated upon entering the human body. At the same time, it is very important to find new methods that will lead to the production of substances (1), (2) at a higher yield than the existing methods and without using liquid chromatography to purify them. To date, the structure of the substance (3) has never been fully and correctly elucidated, nor has an industrially utilizable method of either selective production or in the form of a mixture of substances (3) and (4) been described. The spectroscopic data of the substance (4) has been described (J. Chem. Soc., Perkin trans. 1995, 1, 1519-1523) after enzymatic hydrolysis of pure oleuropein while the substance (4) has been produced in very low yields, in mixtures with other substances that cannot be utilized, from olive fruit extracts (Food Res. Intl. 2000, 33: 475-485).

It should be mentioned that there are references in the literature regarding the use of plants of the *Phillyrea* species, which have been used to produce the S—(Z)-oleaceinediol isomer, in mixture with other non-utilizable substances in very low yield (Phytochemistry Letters 8 (2014) 163-170). In addition, the isomeric substances S—(Z)-oleaceinediol and 5S-(Z)-oleomissionadiol appear to be produced in very low yields, in mixtures with other substances which cannot be utilized, when extracting olive oil with a mixture of water and methanol. (J. Agric. Food Chem. 2015, 66, 6053-6063.)

It is very important to note that substances (1), (2) have different functional groups and in particular two aldehyde groups that that each one of them can react with water in a different way and under different conditions (pH, temperature, time), the association of the specific structures (3), (4) with specific therapeutic actions being therefore not obvious and having an inventive nature.

An important element of innovation in the present invention is the use of polymeric hydrophilic alcohols as solubilizing agents. The proposed alcohols are biocompatible and can completely solubilize the substances (1), (2) and at the same time when they come in contact with water, they can release the active forms (3), (4).

It should be noted that there are references in the literature regarding the use of plants of *Ligustrum* species that have been used for the production of oleacein (1) in very low yield, in mixtures with other substances and with complex purification procedures (Journal of Ethnopharmacology 120 (2008) 220-225).

The chemical structures of the substances described in the present invention are the following:

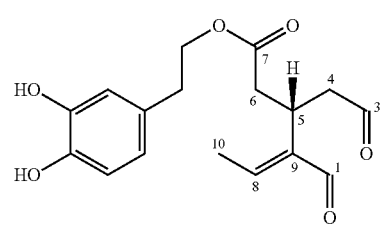

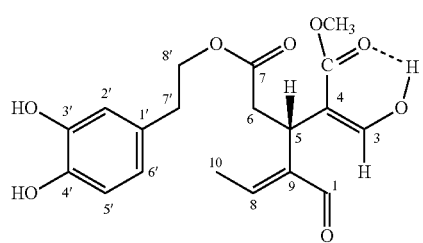

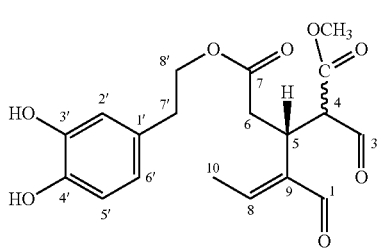

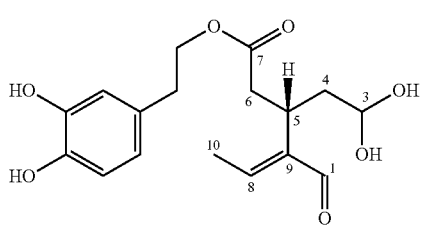

n = 4-9

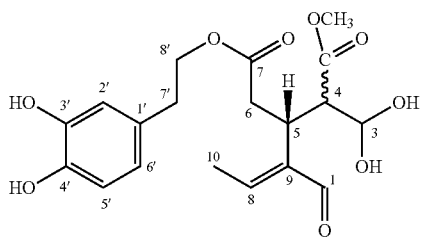

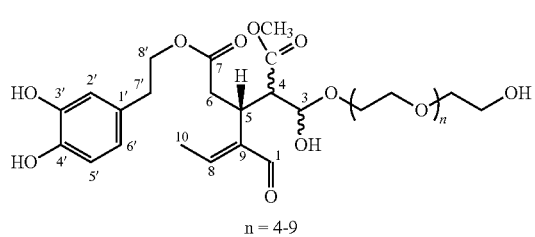

n = 4-9

DETAILED DESCRIPTION OF PREFERRED EMBODIMENTS

1. Principle of the Method for Obtaining Oleaceinediol (3) and Oleacein (1):

Oleaceinediol (3) is produced by the reaction of oleacein (1) with water. Oleacein is biosynthetically produced from the precursor oleuropein substance under the action of β-glucosidase followed by a demethylation and decarboxylation reaction. The inventors know that the most abundant source of oleuropein is either fresh olive leaves (*Olea europaea* L. and all subspecies and cultivars) or partially dried leaves in which glycosidase and demethylase activity is maintained. The enzymes are kept in separate cell compartments from the precursor substance so that no reaction takes place when the leaf is intact.

If the plant enzymes come into contact with the precursor in the presence of water during leaf shredding then conversion of oleuropein to oleacein is achieved at a yield that can reach 1% by weight of fresh leaf. It is specifically pointed out that if the leaves are cut in the absence of water then the yield of this reaction is very low (<0.1%) having no practical usefulness. Also, the reaction does not occur if the water temperature is other than 15-40° C. Previous studies performed by extraction of olive leaves with water at a higher temperature of e.g. 100° C. or even higher (Procopio et al. J. Agric. Food. Chem. 2009, 57, 11161-11167 or Conde et al., Food Chem. 2008, 114, 806-812) indicate that the extracts obtained contain only oleuropein or decomposition products thereof such as hydroxytyrosol but not oleacein due to the fact that at higher temperatures glucosidase is deactivated and therefore cannot react with oleuropein.

In addition, the inventors based on experiments they have performed have found that oleaceinediol when it comes into contact with a non-polar organic solvent such as dichloromethane or ethyl acetate is extracted quantitatively and selectively in the organic phase releasing a molecule of water and returning to the aldehydic lipophilic form. The inventors, utilizing all the above knowledge that has been gained from their experiments, developed the following method of producing a solution of pure oleaceinediol:

1ai. Fresh olive leaves of the *Olea europaea* L. species, including all subspecies and cultivars, (or leaves with a moisture content of 0.1-10%) are cut in the presence of water at a ratio (leaves:water w/w) from 1:1 to 1:20 at 15-40° C. and left into contact for a time period ranging from 30 minutes to 12 hours (mixture A).

1aii. Alternatively, intact fresh fruits of *Olea europaea* L, including all subspecies and cultivars, or frozen fruits come into contact with water at a ratio ranging from 1:1 to 1:20 at 15-40° C. for a period of time ranging from 30 minutes to 12 hours. The yield is higher if the fruit is frozen as during the thawing process the cells rupture and instant contact of the substrate (oleuropein) with the deglycosylation and demethylation enzymes is achieved.

1b. The aqueous mixture A resulting from 1ai or 1aii is filtered and the aqueous phase is obtained. This solution contains oleaceinediol mixed with sugars and other water-soluble phenols.

1c. The aqueous solution from step 1b is extracted with a water immiscible organic solvent in a ratio ranging from 1:10 to 10:1 (e.g. dichloromethane or ethyl acetate or supercritical carbon dioxide) and the organic phase is obtained.

1d. The organic phase from step 1c is evaporated and the product B is obtained, containing oleacein of 95% purity, without the need for further chromatographic purification, in contrast to all methods known to date for the production of oleacein.

1e. Product B (oleacein) is mixed with deionized and distilled water, under vigorous stirring, at a temperature of 15-40° C. for a period ranging from 5 minutes to 24 hours, and during the chemical reaction with water it is converted to a solution of oleaceinediol with a content of up to 2% (solution C). Special attention shall be paid to the pH of the water which should be neutral (6.9-7.1)

1f. Alternatively, product B (oleacein from step 1d) can be mixed with PEG200 to 400 (solution F) polyethylene glycol and converted to a stable polyethylene glycol hemiacetal (5) with a chain size, as shown in the formula, being n=4-9.

1g. Solution F can be diluted with water at a ratio PEG200 (or 400):water ranging from 1:10 to 1:20 or 1:100 etc, yielding the Solution G and converting the polyethylene glycol hemiacetal of oleacein (5) to oleaceinediol (3). Solution G can be used for direct administration to humans per os (syrups, solutions, suspensions), injectable or transdermal (incorporated in creams or gels).

1h. Solution C or F or G can be used at an appropriate concentration to prepare suppositories after mixing with a suitable base (suppository base) or to prepare tablets after mixing with excipients (e.g. lactose), fluid bed drying and compression. It should be noted that in the preparation of tablets, using a suitable excipient and adjusting the moisture levels during drying allow the substance to remain in diol form. This is confirmed by the instant dissolution of the tablet in water which would not have happened if the substance was in the lipophilic aldehydic form.

As can be seen from the spectroscopic examination of solution C using NMR spectroscopy in deuterated water ($D_2O$) (FIG. 1), this is a true solution of the diol form and not an emulsion of the dialdehydic form in the aqueous phase, which is present in a very small amount.

Pharmaceutical Properties of Oleaceinediol:

1i. Solution C or F or G showed a potent antioxidant activity by inhibiting lipid peroxidation at a concentration of 1 μM.

1k. A study of the cytotoxic activity of solution C or F or G showed that oleaceinediol at a concentration of 5 μM could lead to death 50% of HeLa and MCF-7 cancer cells and therefore solution C or F or G and any pharmaceutical preparations derived therefrom can be used to treat cancer.

1l. Solution C or F or G at a concentration of 50 μM of oleaceinediol showed 65% inhibition of the COX-2 enzyme and therefore solution C or F or G and any pharmaceutical preparations derived therefrom can be used to treat inflammatory diseases.

1m. By extension of Cases 1i-1l, solutions C or F or G have the same therapeutic properties (neuroprotective, antidiabetic, antithrombotic) that are known for oleacein as in all cases oleacein is at least partially converted to oleaceinediol in the aqueous medium in which experiments to measure its biological activities are conducted.

Example 1

Dried olive leaves of Kalamata variety (10 kg) with 1% moisture are cut in the presence of water (100 L) at 25° C. and left in contact for 30 min. The mixture is filtered and the aqueous phase is obtained. The aqueous solution is extracted with dichloromethane (80 L) and the dichloromethane layer is obtained and evaporated under vacuum at 30° C. The residue (100 g) is made up of oleacein with a purity of 95%. The oleacein is mixed with water (10 L) under vigorous stirring for 30 min and transformed into a pure oleaceinediol solution. Alternatively, oleacein (1 g) is mixed with PEG200 or PEG 400 (5 ml) and converted into the stable polyethylene glycol hemiacetal. This solution is stable at room temperature for 12 months. This solution can be diluted to 100 ml with a saturated sugar solution affording a syrup containing 1% oleaceinediol, stable for 15-30 days with anti-inflammatory use.

Example 2

Intact olive fruits (200 g) are placed in the freezer (−20° C.) for 24 hours and then left for 24 hours in contact with water (500 ml) at 25° C. The mixture is filtered and the aqueous phase is obtained. The aqueous solution is extracted with dichloromethane (250 ml) and the dichloromethane layer is evaporated under vacuum. The residue (1 g) is made up of oleacein with a purity of 95%. The oleacein is mixed with water (100 ml) under stirring for 30 min and converted to a solution of pure oleaceinediol. Alternatively, oleacein (1 g) is mixed with PEG200 or PEG 400 (5 ml) and converted into stable polyethylene glycol hemiacetal. 100 μL of the polyethylene glycol solution are mixed with melted suppository base (2 g) and allowed to cool to yield suppositories of 100 mg.

2. Principle of Method for Obtaining Oleomissionadiol (4) and Oleomissional (2)

The inventors based on experiments they have performed, they have found that if the olive leaves or the intact unripe green olive fruits come into contact with an organic lipophilic solvent without the plant material being comminuted then only the first stage of deglycosylation takes place, not occurring the second stage of demethylation. In this way, the precursor oleuropein substance, is selectively converted to oleomissional.

This substance, after removal of the organic solvent, may come into contact with an aqueous solution and very slowly react with water and be converted to water-soluble oleomissionadiol (4). In this way it can be separated from the water-insoluble terpenes that are extracted in the first step with the organic solvent. The pure solution of oleomissionadiol is obtained by filtration.

Evaporation of the aqueous solution can provide pure oleomissional (2) as a dehydration reaction occurs and the aldehyde/enol form is gradually restored. At this stage, oleomissional coexists with the two stereoisomeric oleuropeinedials (2a, b).

The inventors, utilizing all of the above knowledge, derived from their experiments, developed the following method of obtaining a solution of pure oleomissionadiol:

2a. Fresh olive leaves or fresh intact olive fruits without being comminuted are brought in contact with a water immiscible organic solvent (e.g. dichloromethane or ethyl acetate or supercritical carbon dioxide) at a ratio ranging from 1:1 to 1:20 at 15-40° C. and left in contact for a time period ranging from 30 minutes to 12 hours (mixture A).

2b. The mixture is filtered and the organic phase is obtained. This solution contains oleomissional in mixture with terpenes (mainly oleanolic and maslinic acid).

2c. The solution is evaporated under reduced pressure and at 30° C. and the residue is obtained.

2d. The residue is dissolved in water (with a pH of not more than 7) under stirring for 1 to 24 hours at 15-35° C. and during the chemical reaction with water oleomissional (and its isomers) is converted to a solution of oleomissionadiol, while all other ingredients remain insoluble. The insoluble ingredients are removed by filtration, and the aqueous solution D containing pure oleomissionadiol (4) is obtained.

2e. The solution is evaporated and the product E is obtained, containing oleomissional (in equilibrium with its isomers) with a total purity of >95% in the form of a viscous liquid.

2f. The product E is dissolved in PEG200 or 400 and converted to a solution H containing the stable oleomissional polyethylene glycol hemiacetal (6).

2g. Solution H can be diluted with water at a ratio of PEG200 (or 400):water=1:10 or 1:20 or 1:100 etc, yielding a solution J in which the oleomissionadiol polyethylene glycol hemiacetal (6) is converted to oleomissionadiol (4). Solution J can be used for direct administration to humans per os (syrups, solutions, suspensions), injectable or transdermal (incorporated in creams or gels).

2h. Solution D or H or J may be used at an appropriate concentration to prepare suppositories after mixing with a suitable base (suppository base) or to prepare tablets after mixing with excipients (e.g. lactose), fluid bed drying and compression. It should be noted that in the preparation of the tablets, using a suitable excipient and adjusting the moisture levels during drying allow the substance to remain in the diol form.

Figure 2:
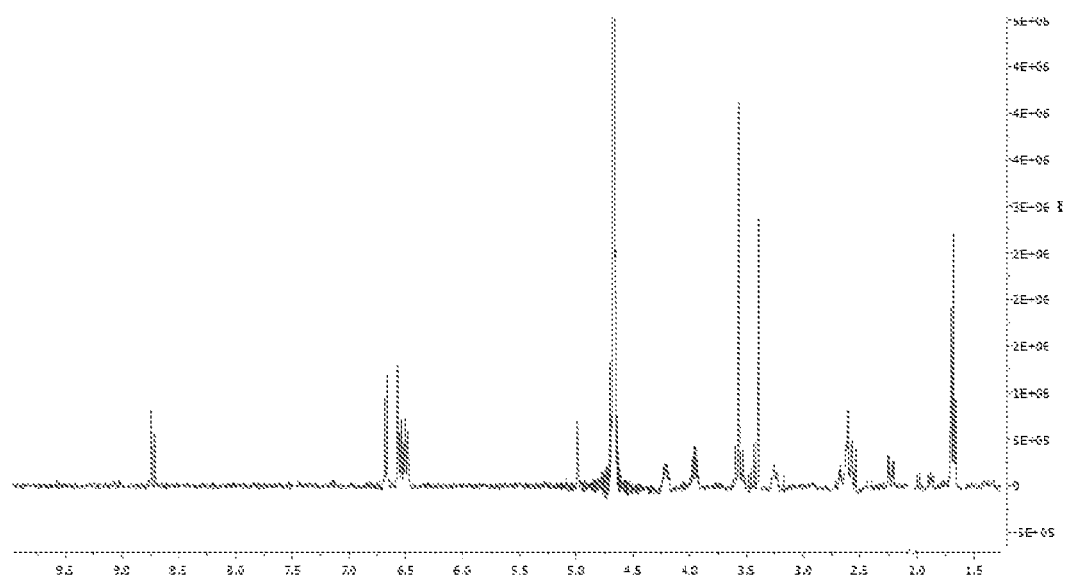

As can be seen from the spectroscopic examination of solution D using NMR spectroscopy (FIG. 2), this is a true solution of the diol form which exists in two diastereomeric forms and not an emulsion of the dialdehydic form.

Pharmaceutical Properties of Oleomissionadiol:

2h. Solution D or H or J showed potent antioxidant activity by inhibiting lipid peroxidation at a concentration of 1 μM.

2i. A study of the cytotoxic activity of solution D or H or J showed that oleomissionadiol at a concentration of 50 μM could lead to cell death 50% of HeLa and MCF-7 cancer cells and therefore solution D or H or J and any derived pharmaceutical preparations therefrom can be used to treat cancer.

2j. Solution D or H or J at a concentration of oleaceinediol at 40 μM showed a 62% inhibition of the COX-2 enzyme and therefore Solutions D or H or J and any derived pharmaceutical preparations therefrom can be used to treat inflammatory diseases.

Example 3

Fresh olive leaves of Koroneiki variety (100 g) are left in contact with dichloromethane (500 g) at 25° C. for 30 min. The mixture is filtered and the organic phase is evaporated under vacuum. The residue is dissolved in deionized and distilled water at pH=6 (100 ml) under stirring for 24 hours, filtered and a solution of pure oleomissional is obtained. The solution is evaporated or lyophilized and oleomissional (160 mg) is obtained with a purity of >95%. Alternatively, oleomissional (160 mg) is mixed with PEG200 or PEG 400 (5 ml) and converted to the stable polyethylene glycol hemiacetal. The resulting solution can be diluted to 100 ml with a saturated sugar solution affording a syrup containing 0.16% of oleomissional stable for 15-30 days with anti-inflammatory activity.

Example 4

Fresh intact olives of the Koroneiki variety (200 g) are left in contact with dichloromethane (500 g) at room temperature for 30 min. The mixture is filtered and the organic phase is evaporated under vacuum. The residue is then dissolved in deionized and distilled water at pH=6 (100 ml) under stirring for 24 hours, filtered and a solution of pure oleomissionadiol is obtained. The solution is evaporated or lyophilized and olieomissional (200 mg) is obtained with a purity of >95%. Alternatively, oleomissional (1 g) is mixed with PEG200 or PEG 400 (5 ml) and converted to the stable polyethylene glycol hemiacetal of oleomissional.

The invention claimed is:

1. A method for obtaining secoiridoids of type

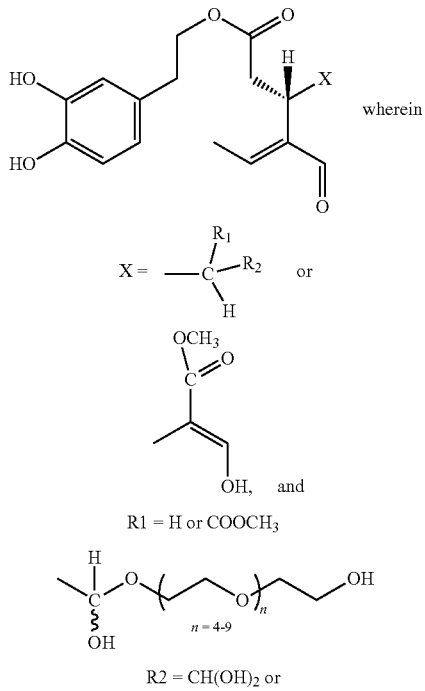

wherein $X = \underset{H}{\overset{R_1}{\underset{|}{\overset{|}{C}}}}\!\!-\!R_2$ or

[structure with OCH$_3$, OH]

R1 = H or COOCH$_3$

[structure]
$n = 4\text{-}9$

R2 = CH(OH)$_2$ or according to which:

plant material from the species *Olea europaea* L., including all subspecies and cultivars, is brought into contact with a solvent, said solvent comprising water or a water immiscible organic solvent, at a ratio ranging from 1:1 to 1:20 at a temperature of 15-40° C., left in contact for a time period ranging from 30 minutes to 12 hours, to activate at said temperature a reaction of an enzyme with oleuropein, said enzyme and oleuropein present in said plant material, and generate a mixture (A).

2. The method for obtaining secoiridoids according to claim 1, where the plant material is fresh or dried leaves with moisture ranging from 0.1% to 10%, which have been previously comminuted inside a water solution or intact fresh fruits or fruits that have been refrigerated at 2-8° C. or frozen at −18 to −24° C. for at least 24 hours and the solvent is water, further including:

filtration of mixture (A), obtaining of the aqueous phase, extraction thereof with a water immiscible organic solvent, selected from a group of solvents consisted of dichloromethane or ethyl acetate or supercritical carbon dioxide at a ratio ranging from 10:1 to 1:10, obtaining and evaporation of the organic phase, affording a product (B), which contains the substance where:

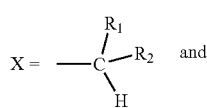

R1 = H and R2 = CHO

3. The method for obtaining secoiridoids according to claim 2, which in addition includes mixing of product (B) with deionized and distilled water with pH=6.9-7.1 at a ratio of up to 2% w/w and temperature 15-40° C. for a time period ranging from 5 min to 24 hours, affording a solution (C), which contains the substance with:

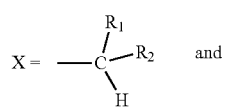

R1 = H and R2 = CH(OH)$_2$.

4. The method for obtaining secoiridoids according to claim 1, where the plant material is made up of intact fresh leaves or fruits, the solvent is a water immiscible organic solvent, selected from a group of solvents consisting of dichloromethane or ethyl acetate or supercritical carbon dioxide and in addition it includes:
 filtration of mixture (A), obtaining of the organic phase, evaporation thereof, obtaining of the residue, dilution thereof in deionized and distilled water with pH=<7 under stirring at a ratio of up to 2% w/w and temperature 15-35° C. for a time period ranging from 1 to 24 hours, removal of the insoluble ingredients by filtration and obtaining of solution (D), which contains the substance with:

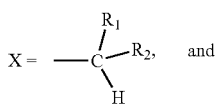

R1 = COOCH$_3$ and R2 = CH(OH)$_2$.

5. The method for obtaining secoiridoids according to claim 4, which in addition includes evaporation of solution (D) under reduced pressure and temperature <40° C., which affords a product (E), which contains substances with:

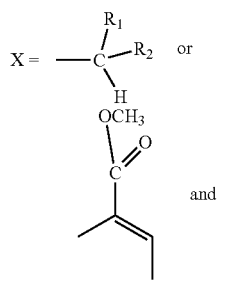

R1 = COOCH$_3$ and R2 = CHO.

6. Method for obtaining secoiridoids according to claim 2, which in addition includes mixing of product (B) with polyethylene glycol of average molecular weight ranging from 200 to 400 (PEG200 to 400), which affords solution (F), which contains the substance with:

X = —C(R$_1$)(R$_2$)H and

R1 = H

R2 = CH(OH)—O—(CH$_2$CH$_2$O)$_n$—CH$_2$CH$_2$OH n = 4-9

7. The method for obtaining secoiridoids according to claim 5, which in addition includes mixing of product (E) with polyethylene glycol of average molecular weight ranging from 200 to 400 (PEG200 to 400), which affords solution (H), which contains the substance with:

X = —C(R$_1$)(R$_2$)H and

R1 = COOCH$_3$

R2 = CH(OH)—O—(CH$_2$CH$_2$O)$_n$—CH$_2$CH$_2$OH.

n = 4-9

8. The method for obtaining secoiridoids according to claim 6, which in addition includes dilution of solution (F) with water at a ratio of polyethylene glycol: water=1:10 or 1:20 or 1:100, which affords solution (G) which contains the substance with:

X = —C(R$_1$)(R$_2$)H, and

R1 = H and R2 = CH(OH)$_2$.

9. The method for obtaining secoiridoids according to claim 7, which in addition includes dilution of solution (H) with water at a ratio of polyethylene glycol: water=1:10 or 1:20 or 1:100, which affords solution (J) which contains the substance with:

X = —C(R$_1$)(R$_2$)H,

R1 = COOCH$_3$ and R2 = CH(OH)$_2$.

10. Secoiridoids of type

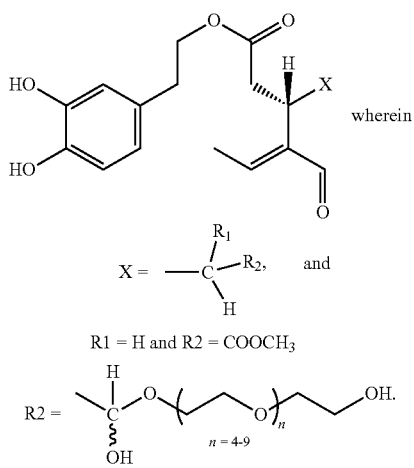

wherein

R1 = H and R2 = COOCH3

11. Secoiridoids of type

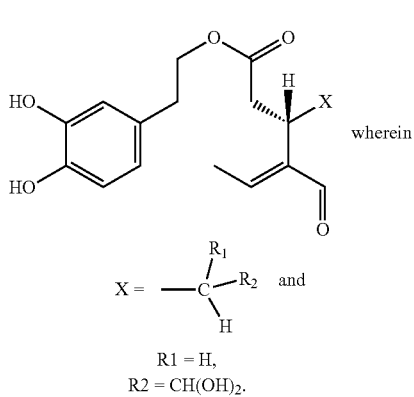

wherein

R1 = H,
R2 = CH(OH)2.

12. A pharmaceutical preparation containing secoiridoids of type

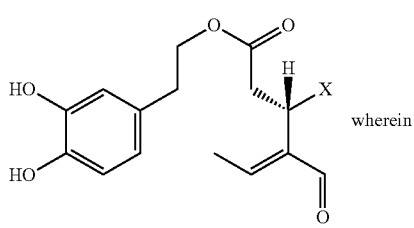

wherein

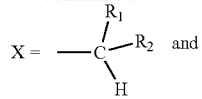

R1 = H and R2 = CH(OH)2 or

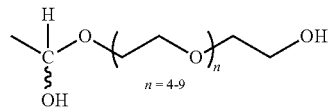

mixed with appropriate excipients to produce pharmaceutical preparations for administration by oral, transdermal, injectable, or suppository routes, or as tablets produced through drying and compression.

13. A pharmaceutical preparation containing secoiridoids of type

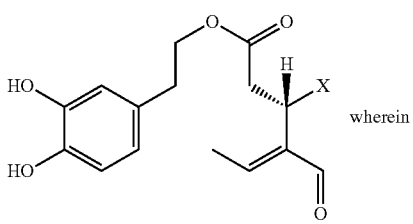

wherein

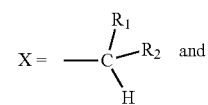

R1 = H and R2 = CH(OH)2 or R2 = 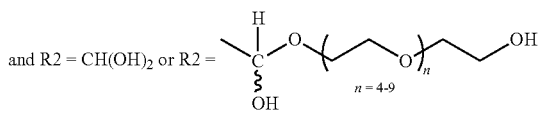

mixed with appropriate excipients for the production of nutritional supplements.

14. The pharmaceutical preparation of claim 12 adapted for the treatment of cancer, neurodegenerative diseases, diabetes, hyperlipidemia, inflammatory diseases, and for treatment of conditions associated with atherosclerotic plaques and thrombi.

* * * * *